(12) United States Patent
Kubota et al.

(10) Patent No.: US 6,480,881 B1
(45) Date of Patent: *Nov. 12, 2002

(54) INFORMATION ACCESS APPARATUS AND METHOD FOR COOPERATIVELY SHARING KNOWLEDGE ABOUT INFORMATION SOURCE

(75) Inventors: Kazumi Kubota; Hiroshi Ishikawa, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,141

(22) Filed: Dec. 3, 1996

(30) Foreign Application Priority Data

May 29, 1996 (JP) .............................. 8-134863

(51) Int. Cl.[7] .............................. G06F 15/16
(52) U.S. Cl. ..................... 709/202; 709/317; 709/217; 707/3
(58) Field of Search ................. 395/683, 682, 395/685, 680, 200.32; 709/202, 317; 707/2, 3

(56) References Cited

U.S. PATENT DOCUMENTS

| | | | | |
|---|---|---|---|---|
| 5,471,617 A | * | 11/1995 | Farrand et al. | 709/100 |
| 5,539,665 A | | 7/1996 | Lamming, et al. | |
| 5,603,031 A | * | 2/1997 | White et al. | 709/317 |
| 5,623,652 A | * | 4/1997 | Vora et al. | 707/10 |
| 5,774,656 A | * | 6/1998 | Hattori et al. | 709/223 |
| 5,806,065 A | * | 9/1998 | Lomet | 707/8 |
| 5,887,171 A | * | 3/1999 | Tada et al. | 707/10 |
| 6,016,393 A | * | 1/2000 | White et al. | 709/315 |
| 6,092,099 A | * | 7/2000 | Irie et al. | 709/202 |
| 6,119,101 A | * | 9/2000 | Peckover | 705/10 |
| 6,134,580 A | * | 10/2000 | Tahara et al. | 709/202 |
| 6,212,545 B1 | * | 4/2001 | Ohtani et al. | 709/202 |
| 6,286,002 B1 | * | 9/2001 | Axaopoulos et al. | 705/26 |

FOREIGN PATENT DOCUMENTS

| | | | | |
|---|---|---|---|---|
| JP | 06-301577 | 10/1994 | | |
| WO | WO-A1-9502219 | 1/1995 | | |
| WO | WO 97/26612 | * | 7/1997 | G06F/17/60 |

OTHER PUBLICATIONS

Kotz, David et al. "Transportable Agents Support Worldwide Applications". ACM 1996.*

Dharap, Chanda et al. "Information Agents for Automated Browsing". ACM Nov. 1996.*

Lien, Yao–Nan et al. "On the Search of Mobile Agents". IEEE May 1996.*

Lingnau, Anselm et al. "Making Mobile Agents Communicate: A Flexible Approach". IEEE Mar. 1996.*

O'Riordan, Adrian et al. "An Intelligent Agent for High–Precision Text Filtering" ACM 1995.*

Bowman, C et al. "The Harvest Information Discovery and Access Guide" p. 1–9, 1994.*

(List continued on next page.)

Primary Examiner—St. John Courtenay, III
Assistant Examiner—Lewis A. Bullock, Jr.
(74) Attorney, Agent, or Firm—Staas & Halsey LLP

(57) ABSTRACT

An agent generated based on a request made by a user accesses an object server on a wide area network to obtain necessary information. If sufficient information cannot be obtained from a database in a certain server, the agent obtains knowledge about an information source previously accessed by another agent by referencing a path information table, and accesses another server based on the knowledge. Thus, the information collection is made more efficient by making the most of the knowledge of other agents.

11 Claims, 13 Drawing Sheets

OTHER PUBLICATIONS

Davies J. et al. "Jasper: Communicating Information Agents in WWW" p. 1–11, Dec. 1995.*

(Cengeloglu) Cengeloglu, Yilmaz et al. "A Framework for Dynamic Knowledge Exchange Among Intelligent Agents", Nov. 1994.*

David Chess et al. "Itinerant Agents for Mobile Computing", Oct. 1995.*

William Stallings "SNMP, SNMPv2 and RMON", 1996.*

Emilio Ramos. "Data Communications and Networking Fundamentals Using Novell Netware", 1992.*

Dannenberg, Roger B. & Peter G. Hibbard. "A Butler Process for Resource Sharing on Spice Machines." ACM Trasactions on Office Information Systems, p. 234–252, Jul. 1985.*

\* cited by examiner

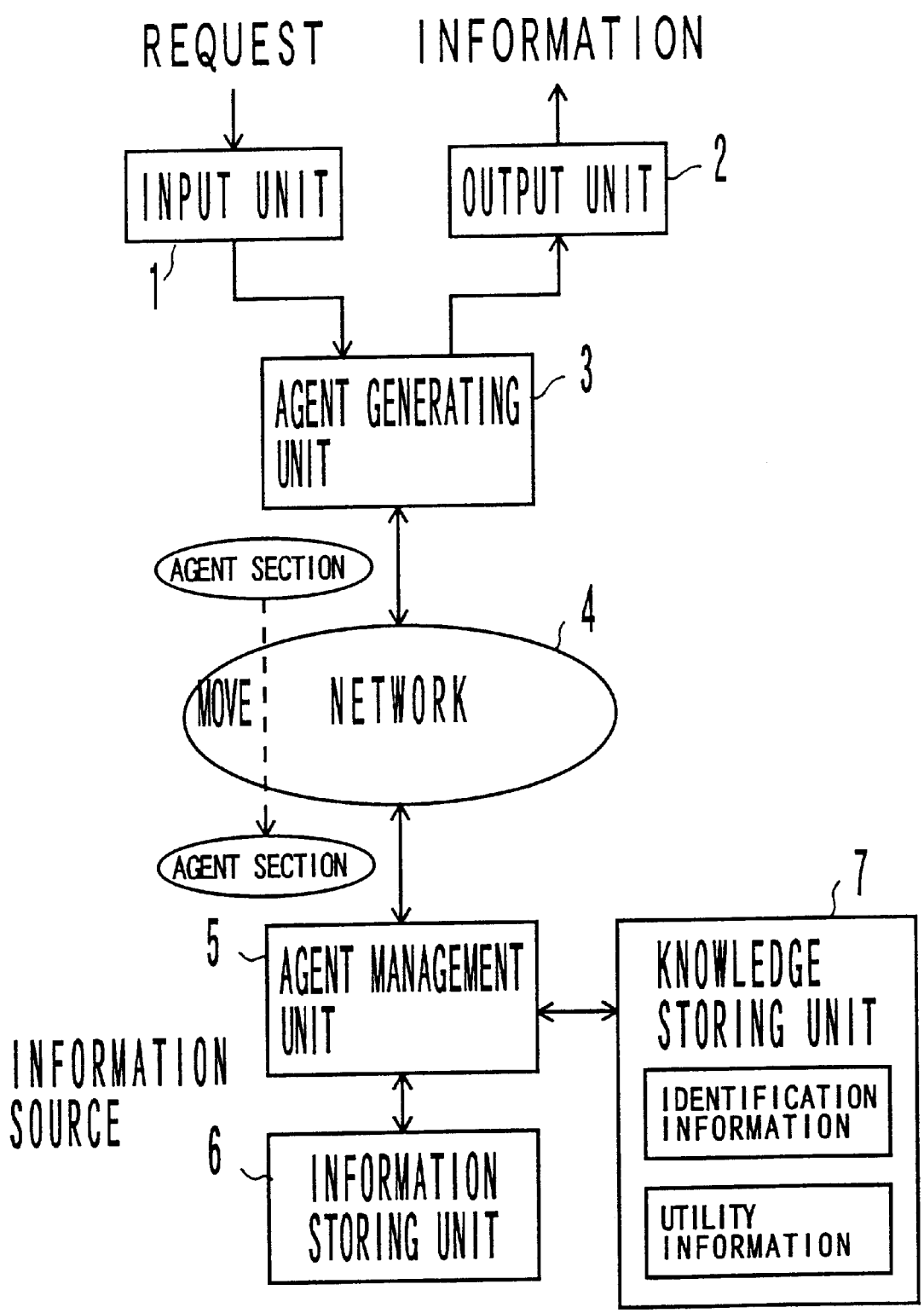
F I G. 1

| KEYWORD | PATH | AGENT | DATE |
|---|---|---|---|
| PERSONNEL | A(15)-->B(40)-->H(30)-->Z(80) | a001 | 95.12.1 |
| PAY | J(2)-->B(23)-->N(95)-->Z(25) | a015 | 95.12.5 |
| AAA Co. | F(20)-->P(50)-->Z(75) | a752 | 95.12.5 |
| BBB Co. | C-->A-->T-->Q(98)-->Z(14) | a569 | 95.12.10 |
| ⋮ | | | |
| ⋮ | | | |
| ⋮ | | | |
| PART PPP | S(10)-->T(5)-->V(20)-->Z(95) | a563 | 95.12.11 |
| PART PPP | V(10)-->S(10)-->T(80)-->Z(10) | a058 | 95.12.11 |
| BBB Co. | T(1)-->Q(10)-->Z(40) | a569 | 95.12.12 |
| AAA Co. | F(2)-->P(89)-->Z(30) | a752 | 95.12.13 |

FIG. 5

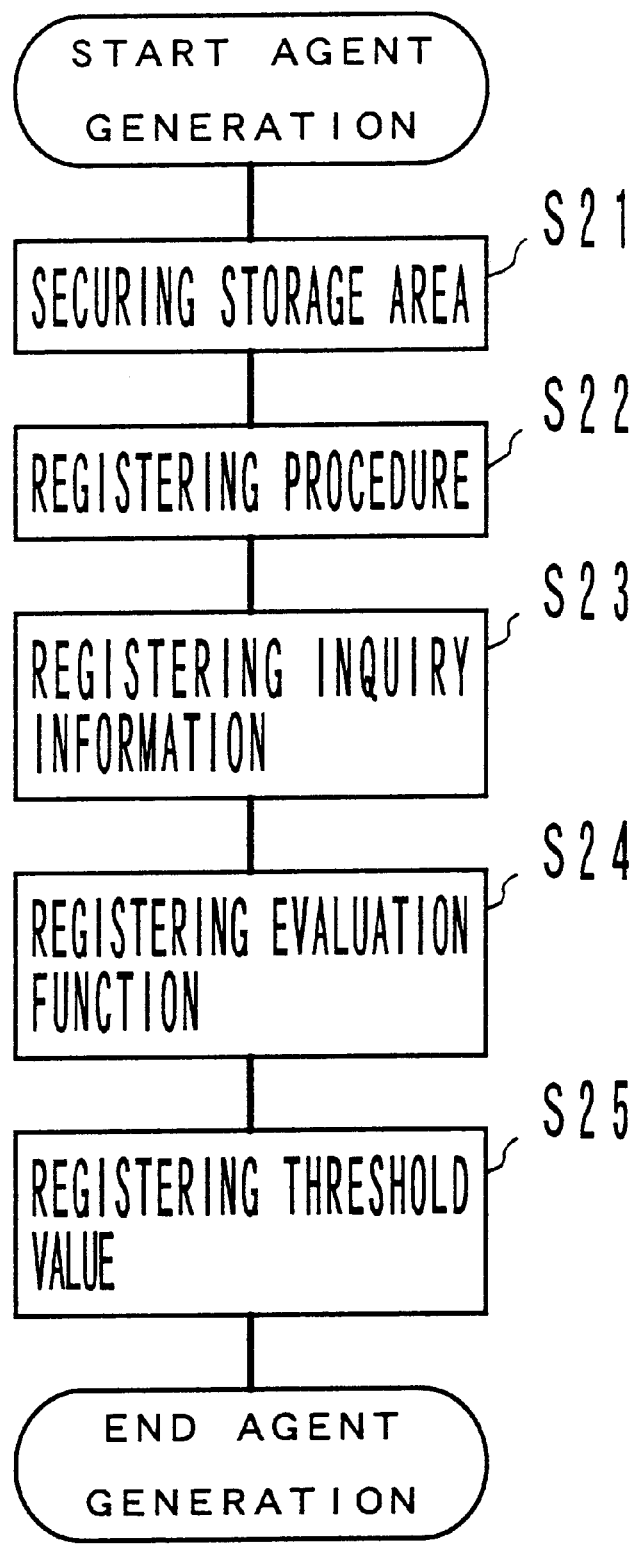
F I G. 7

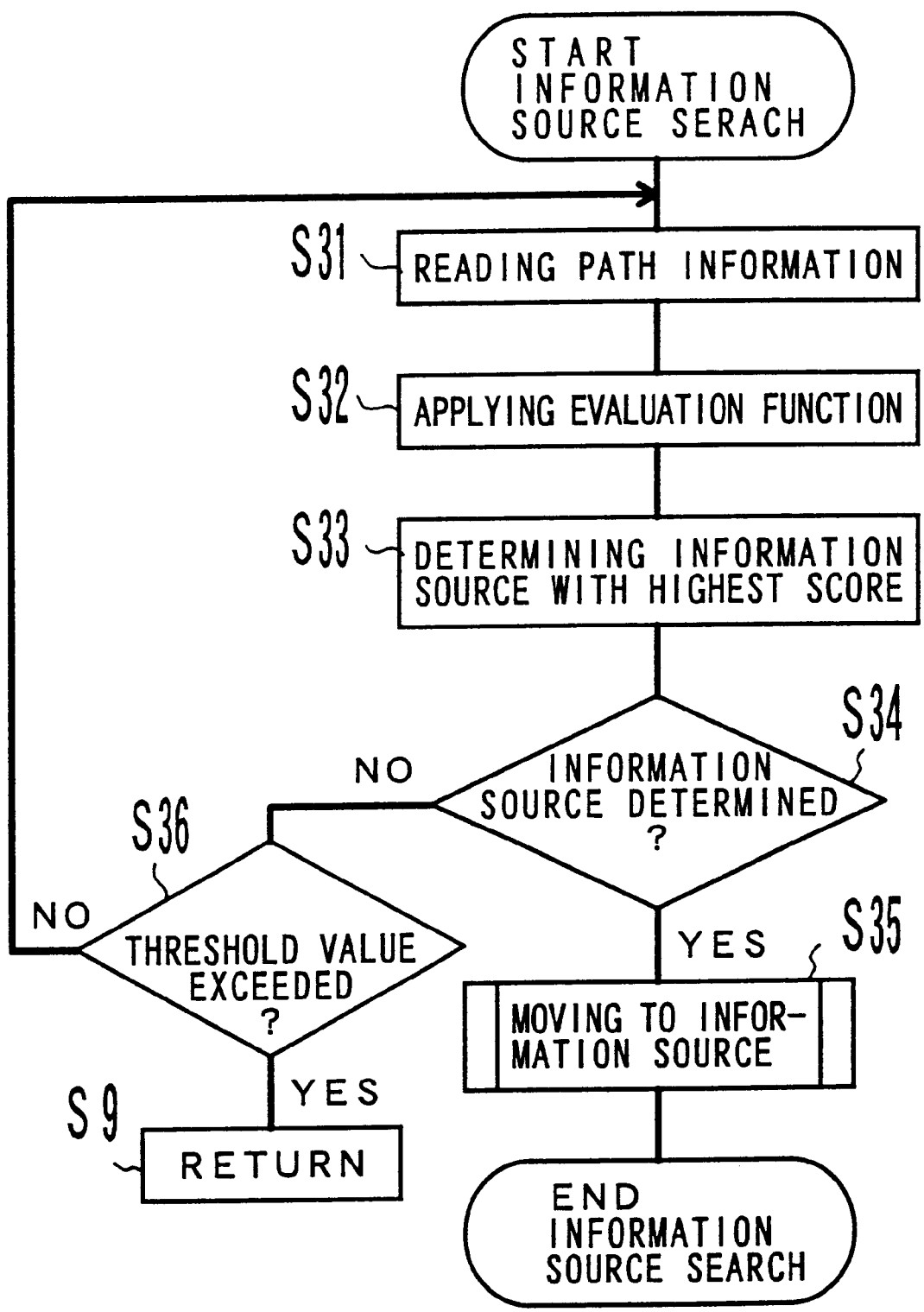
F I G. 8

| KEYWORD | PATH | AGENT | DATE |
|---|---|---|---|
| AAA Co. | F(20)-->P(50)-->Z(75) | a752 | 95.12.5 |
| PART PPP | S(10)-->T(5)-->V(20)-->Z(95) | a563 | 95.12.11 |
| PART PPP | V(10)-->S(10)-->T(80)-->Z(10) | a058 | 95.12.11 |
| AAA Co. | F(2)-->T(56)-->P(89)-->Z(30) | a752 | 95.12.13 |

F I G. 9

| KEYWORD | PATH | AGENT | DATE | INFORMATION SOURCE WHERE FAULT OCCURRED |
|---|---|---|---|---|
| PERSONNEL | A(15)-->B(40)-->H(30)-->Z(80) | a 0 0 1 | 95.12.1 | — |
| PAY | J(2)-->B(23)-->N(95)-->Z(25) | a 0 1 5 | 95.12.5 | A-->L |
| AAA Co. | F(20)-->P(50)-->Z(75) | a 7 5 2 | 95.12.5 | Q |
| BBB Co. | C-->A-->T-->Q(98)-->Z(14) | a 5 6 9 | 95.12.10 | — |
| ⋮ | | | | |
| ⋮ | | | | |
| ⋮ | | | | |
| PART PPP | S(10)-->T(5)-->V(20)-->Z(95) | a 5 6 3 | 95.12.11 | — |
| PART PPP | V(10)-->S(10)-->T(80)-->Z(10) | a 0 5 8 | 95.12.11 | — |
| BBB Co. | T(1)-->Q(10)-->Z(40) | a 5 6 9 | 95.12.12 | — |
| AAA Co. | F(2)-->P(89)-->Z(30) | a 7 5 2 | 95.12.13 | — |

F I G. 1 3

INFORMATION ACCESS APPARATUS AND METHOD FOR COOPERATIVELY SHARING KNOWLEDGE ABOUT INFORMATION SOURCE

BACKGROUND OF THE INVENTION

1. Field of the Invention

The present invention relates to a distributed information system for distributing and locating a plurality of information sources, and more particularly to an information access apparatus for searching required information such as an object, etc. within the system.

2. Description of the Related Art

Due to environmental changes in computer systems today, a computer environment in which an information management system is employed is changing from an intensive-type environment centering on database servers to a distributed object management system running on a plurality of workstations connected via a high-speed network.

Conventional database systems are intended to store and provide mainly numerical and character data. With the variety of information required, the distributed object management system needs to store and provide not only data such as numerals, characters, etc., but also various types of objects such as procedures, programs, data structures, etc.

These objects are distributed and stored in object servers mutually connected via a network, and users can satisfy their needs by requesting an information providing service of an object server storing the information that they require.

However, as the scale of the distributed information system in such a form grows, it becomes more difficult for the users to learn which object server stores the information that they require.

One of solutions to this problem is an agent technique employing an agent on behalf of a user. Here, the agent means, in the widest definition, a capability of performing an intelligent operation instead of it being performed by a user. In most cases, the agent is generated as a process on a computer.

By way of example, an agent described in telescript, which is the language based on remote programming, can perform a programmed process by autonomically moving within a network. (Japanese patent laid-open H07-182174, Priority Data: U.S. Ser. No. 08/090,521). There is also a method for delegating an artificial agent based on a user request to information sources in order to obtain necessary information, by taking advantage of this feature (Japanese patent laid-open H06-301577).

In addition, there is another method where an delegated agent allows information exchange between another agent and itself using a communication section (Japanese patent laid-open H07-225798, Priority Data: GB 9315448:2). Furthermore, an agent which does not move, but asynchronously performs a process while communicating with another agent, can be considered.

With the above described techniques, the users can obtain the necessary information by delegating an agent, making one agent and communicate with another, even if the users themselves do not know where the information sources are located.

However, the conventional agent techniques described above have the following problems.

According to the conventional agent techniques, an agent delegated by a user must obtain a path to information sources from one particular server storing path information about that path, or search for the path using a heuristic method. Accordingly, it takes a lot of time for the user to obtain an answer from the agent to the inquiry, or it is difficult for the user to estimate the amount of time until he or she can obtain an answer.

With a large-scale distributed system consisting of a plurality of information sources which are autonomically updated, it is difficult to know which information source is updated when. Therefore, if the particular server providing an agent with path information is introduced, there is great difficulty in collecting the path information stored in that particular server. As a result, the possibility that the latest path information could not be obtained increases significantly.

SUMMARY OF THE INVENTION

The object of the present invention is to provide an information access apparatus and its method for allowing required information to be obtained efficiently and quickly from various types of information sources, put into an electronic form and distributed over an extensive range, by taking advantage of information about the information sources, such as path information possessed by an agent.

In first and second aspects of the present invention, an information access apparatus, which corresponds to an information processing device on a client side being an access source, comprises an agent generating unit and an output unit.

In the first aspect, the agent generating unit generates a first agent section that obtains knowledge about at least one information source accessed by a second agent section autonomically, collecting information using a network, among a plurality of information sources, and obtains information from the at least one information source based on the knowledge. The output unit outputs the information collected by the first agent section.

The agent section used here is, for example, a process having a capability of performing an intelligent operation instead of a user. It includes a movable agent described in a distributed processing description language, and an immovable agent fixed in a computer. The knowledge about an information source indicates, for example, identification information identifying an information source, and utility information indicating a degree of utilization of the information source. The name of an information source, identifier, etc. are used as the identification information, while a score (to be explained later) of the information source, etc. is used as the utility information.

According to such a configuration, the first agent section can learn of the existence of the information source without making any direct access, and collect the necessary information from the information source. Therefore, a plurality of agent sections effectively share the knowledge about their information sources. In addition, an unidentified information source from which the required information could be obtained with high probability, can be found efficiently, by referencing the utility information about each information source.

In the second aspect, the agent generating unit generates a third agent section that autonomically accesses at least one information source among a plurality of information sources, obtains knowledge about the at least one information source, and notifies a fourth agent section of the knowledge using a network. An output unit outputs the information that the third agent section collects.

According to such a configuration, the fourth agent section can learn of the existence of the information source without making any direct access, and collect the required information from the information source, in a similar manner as in the first aspect. Therefore, a plurality of agent sections can share the knowledge about their information sources effectively.

Furthermore, an information access apparatus in the third aspect of the present invention, which corresponds to an information processing device located at an information source on a server side, comprises an agent management unit, information storing unit, and knowledge storing unit.

In the third aspect, the information storing unit stores information, while the knowledge storing unit stores knowledge about at least one information source accessed by a fifth agent section using a network, among a plurality of information sources.

The agent management unit provides a sixth agent section with information obtained from the information storing unit based on an access request made by the sixth agent section, stores the knowledge about any of the plurality of information sources in the knowledge storing unit after receiving it from the sixth agent section, and provides the sixth agent section with the knowledge about the at least one information source after extracting it from the knowledge storing unit.

According to such a configuration, the sixth agent section can learn of the existence of the information source without making any direct access, and collect the required information from that source, in a similar manner as in the first and second aspects. As a result, a plurality of agent sections can share the knowledge about their information sources effectively.

BRIEF DESCRIPTION OF THE DRAWINGS

FIG. 1 shows the principles of an information access apparatus according to the present invention;

FIG. 5 exemplifies a path information table in an information source Z;

FIG. 7 is a flowchart showing a generation process of the agent section;

FIG. 8 is a flowchart showing a search process for an information source;

FIG. 9 exemplifies path information;

FIG. 13 exemplifies a path information table including fault information.

DESCRIPTION OF THE PREFERRED EMBODIMENTS

Figure 2:
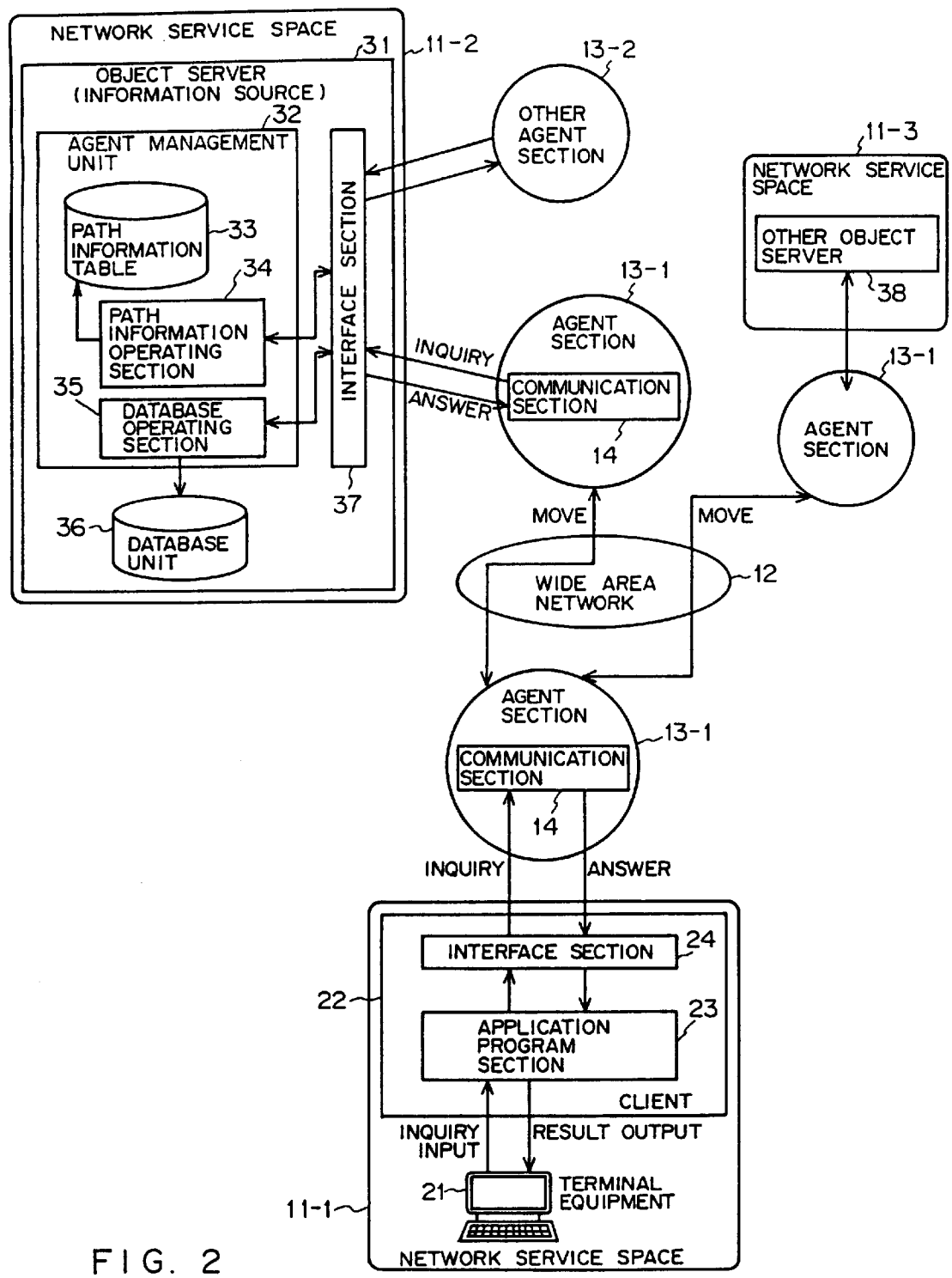
FIG. 2 shows the configuration of a distributed information system including the information access apparatus according to the present invention.

Provided below is the detailed explanation about a preferred embodiment of the present invention, by referring to the drawings.

FIG. 1 shows the principles of the information access apparatus according to the present invention. This apparatus includes three principles from the first through to the third.

The information access apparatus according to the first and second principles, which corresponds to an information processing device on a client side being an access source, comprises an input unit 1, an output unit 2, and an agent generating unit 3.

According to the first principle, the agent generating unit 3 generates a first agent section that obtains knowledge of at least one information source, which is at least one of a plurality of information sources, accessed by a second agent section that autonomically collects information, by taking advantage of a network 4, and that obtains information from the at least one information source based on that knowledge.

The output unit 2 outputs information that the first agent section collects.

The agent section used here is a process having a capability of performing an intelligent operation instead of a user. It includes a movable agent described in a distributed processing description language, and an immovable agent fixed in a computer. The second agent section is generated by the agent generating unit 3 included in the information access device, or by another information access device.

If the first and second agent sections can move over a network 4, the second agent section moves to any of information sources to access the information, and to obtain the knowledge about that information source.

Here, the knowledge about an information source indicates, for example, identification information identifying the information source and utility information representing the utilization of the information source. The name of an information source, identifier, etc. are used as the identification information, while a score of the information source, etc. is used as the utility information. The second agent section may further move while keeping the knowledge about the obtained information source, and may register the knowledge in a suitable location on the network 4.

The first agent section obtains the knowledge about the information source that the second agent section obtained, by communicating with the second agent section, or by moving around the network 4, and learns of the existence of corresponding information source. After the first agent section moves to that information source and obtains its information, it returns to the information access apparatus being the generation source, and then outputs the collected information from the output unit 2.

If these agent sections cannot move, the second agent section accesses any of the information sources with a method such as an RPC (Remote Procedure Call), etc. to obtain the knowledge about that information source. The first agent section obtains the knowledge about the information source that the second agent section obtained, by communicating with the second agent section, and learns of the existence of the corresponding information source. Then, the first agent section accesses that information source, and outputs the obtained information from the output unit 2.

According to the first principle as described above, the first agent section can learn of the existence of an information source without making any direct access, and collect required information from the information source. Accordingly, a plurality of agent sections can share the knowledge about their information sources effectively. In addition, an unidentified information source from which required information could be obtained with high probability, can be found efficiently by referencing utility information about each information source.

The input unit 1 inputs a user request to the agent generating unit 3. The agent generating unit 3 generates the above described first agent section based on that request. Then, the first agent section efficiently collects information requested by the user, and reports the obtained result to the user via the output unit 2.

In the meantime, according to the second principle, the agent generating unit 3 generates a third agent section that autonomically accesses at least one of a plurality of information sources, that obtains the knowledge about the at least one information source, and that notifies a fourth agent section of the knowledge using the network 4.

The output unit 2 outputs the information collected by the third agent section.

If the third and fourth agent sections can move, the third agent section moves to any of the information sources and accesses its information, and obtains the knowledge about that information source. The third agent section then notifies the fourth agent section of the knowledge by communicating with the fourth agent section, or by registering the obtained knowledge about the information source to a suitable location in the network 4.

Thus, the fourth agent section can learn of the existence of the corresponding information source, thereby accessing that information source.

After the third agent section notifies the fourth agent section of the knowledge about the information source, it returns to the information access apparatus being the generation source, and outputs the collected information from the output unit 2.

If these agent sections cannot move, the third agent section accesses any of the information sources with a method such as the RPC, etc., and obtains the knowledge about that information source. The third agent section then notifies the fourth agent of that knowledge by communicating with the fourth agent section, and outputs the collected information from the output unit 2.

According to the above described second principle, the fourth agent section can learn of the existence of the information source without making any direct access, and collect the required information from that information source, in a similar manner as in the first principle. Accordingly, a plurality of agent sections can share the knowledge about the their information sources effectively.

The information access apparatus according to the third principle, which corresponds to an information processing device located at an information source on a server side, comprises an agent management unit 5, information storing unit 6, and knowledge storing unit 7.

According to the third principle, the information storing unit 6 stores information.

The knowledge storing unit 7 stores the knowledge about at least one information source, which is at least one of a plurality of information source, accessed by the fifth agent section using the network 4.

The agent management unit 5 provides a sixth agent section with information obtained from the information storing unit 6 based on an access request made by the sixth agent section, receives the knowledge about any of the plurality of information sources from the sixth agent section, and stores the received knowledge in the knowledge storing unit 7. Then, it extracts the knowledge about the at least one information source from the knowledge storing unit 7, and provides the sixth agent section with the extracted knowledge.

If the fifth and sixth agent sections can move, the agent management unit 5 first receives the knowledge about the information source that the fifth agent 5 previously accessed, from the fifth agent section that arrived from the access source prior to the sixth agent section, and stores the received knowledge in the knowledge storing unit 7.

Upon arrival of the sixth agent section, the agent management unit 5 receives an access request from the sixth agent section, accesses the information storing unit 6, and returns the information satisfying the request. Then, it receives the knowledge about the information source that the sixth agent section previously accessed, and stores that knowledge in the knowledge storing unit 7.

Furthermore, the agent management unit 5 extracts the knowledge about the information source that the fifth agent section accesses from the knowledge storing unit 7, and provides it to the sixth agent section. In this way, the sixth agent section learns of the existence of the corresponding information source, thereby accessing that information source.

If these agent sections cannot move, the fifth agent section generated at the access source transmits the knowledge about the previously-accessed information source to the agent management unit 5 using a method such as the RPC, etc. The agent management unit 5 stores the knowledge received from the fifth agent section in the knowledge storing unit 7.

When an access request is transmitted from the sixth agent section, the agent management unit 5 accesses the information storing unit 6, and returns the information satisfying the request. Additionally, when receiving from the sixth agent section the knowledge about the information source that the sixth agent section previously accessed, the agent management unit 5 stores that knowledge in the knowledge storing unit 7.

At this time, the agent management unit 5 extracts the knowledge about the information source that the fifth agent section accessed from the knowledge storing unit 7, and transmits that knowledge to the sixth agent. In this way, the sixth agent section learns the existence of the corresponding information source, thereby accessing that information source.

According to the third principle as described above, the sixth agent section can learn of the existence of the information source without making any direct access, and collect the required information from that information source, in a similar manner as in the first and second principles. As a result, a plurality of agents can share the knowledge about their information resources effectively.

With the above described information access apparatus according to the first, second, and third principles, when a number of information sources distributed on the network 4 are searched using agents, a plurality of agents can share the information about previously-accessed information sources.

Accordingly, each agent can choose an appropriate information source to be accessed next among information sources that the other agents accessed previously, thereby realizing information collection with a higher efficiency than in the case where an information source is searched at random. In addition, the information collection can be made more efficient by sharing the information indicating utility of the previously-accessed information sources among a plurality of agents.

By way of example, the input unit 1 and output unit 2 shown in FIG. 1 correspond to terminal equipment 21 shown in FIG. 2, to be described later, or a network connecting device 43 shown in FIG. 3. The agent generating unit 3 corresponds to an application program section 23 shown in FIG. 2, and the agent management unit 5 corresponds to an agent management unit 32. The information storing unit 6 corresponds to a database unit 36 shown in FIG. 2, and the knowledge storing unit 7 corresponds to a path information table 33.

The information access apparatus according to the present invention can be implemented as a client system or a server system connected to a communications network. For the client system, an agent section is generated based on a user request, and the agent section moves around the database servers on the network in order to obtain the information.

At this time, the agent section sequentially writes names of information sources such as servers that the agent itself visits in its course from the client to a database server, to a path information table arranged in the server, as the path information. Additionally, the agent section determines a score for the information source. Here, a score is a degree of utility of each information source based on a search condition such as a keyword passed from a user. The agent section adds the search condition and the score to the path information.

Next, the agent section references the path information that the other agent section left in the path information table. If there is an unidentified information source with high score under the same search condition, the agent section moves to that database server. As a result of repeating these operations, the agent section returns to the client being the generation source to present the information obtained at that time to the user when all pieces of required information are obtained, or when a predetermined amount of restricted time elapses.

Thus, a number of agent sections make the most of mutual path information by arranging a path information table to which the path information is registered, for each information source, thereby searching for an information source cooperatively. Accordingly, the degree of utilization can be estimated with high probability even for an information source yet to be searched. As a result, the information can be obtained with a higher efficiency than in the case where the agent section moves around information sources at random.

Since the agent section sequentially writes the latest path information to the path information table arranged in each information source, the latest path information can be obtained without performing any extra process for collecting the path information. It leads to greater efficiency of searching an information source.

FIG. 2 is a schematic diagram showing a distributed information system including the information access apparatus according to the present invention. In this figure, a wide area network 12 interconnects network service spaces 11-1, 11-2, and 11-3 which are self-operated to form a virtual wide area network service space.

Here, the network service space indicates, for example, a LAN (Local Area Network) in a company, and includes information processing devices such as personal computers, workstations, etc. connected to the LAN. In addition, the network service space may be implemented as a larger network consisting of a plurality of interconnected LANs.

The network service space 11-1 represents a space on a client side which requests an information providing service, and includes a client 22 connected to user terminal equipment 21. On the client 22, an application program section 23 and an interface section 24 are installed as software.

The network service space 11-2 represents a space on a server side which provides information, and includes an object server 31 which is one type of information source. The object server 31 comprises a database unit 36 storing information, with an agent management unit 32 and an interface section 37 installed as software. The database unit 36 stores data such as numerals, characters, etc. in addition to various types of objects such as a procedure, program, data structure, etc.

The agent management unit 32 corresponds to, for example, a software engine including an interpreter, etc. for executing a procedure that the agent section 13-1 holds. This section includes a path information operating section 34 for accessing a path information table 33, and a database operating section 35 for accessing the database unit 36.

The network service space 11-3 represents another server space including other object server 38. A larger number of network service spaces on the client and server sides may be connected to the wide area network 12.

The case will now be considered where a user belonging to the network service space 11-1 requires information stored in the database unit 36 in the object server 31 belonging to another network service space, whose location is yet to be identified. The user inputs an inquiry request for the information that he or she requires, to the application program section 23 on the client 22 via the user interface section on the terminal equipment 21.

The application program section 23 generates an agent section 13-1, and passes the input inquiry request to the agent section 13-1 via the interface section 24. The agent section 13-1 is an artificial agent delegated to an information source based on a user request, and a movable process having a capability of collecting information by being connected to the information source, instead of the user.

The agent section 13-1 includes a communication section 14 for receiving a process request from the interface section 24, and keeps the received process request as inquiry information.

The agent section 13-1 which stored the inquiry information moves over the wide area network 12 while serching for a network service space to which the target information source belongs. At this time, the agent section 13-1 keeps the path, on which it passed through when searching the information source, as path information.

The agent section 13-1 that reaches the target information source establishes a connection between the interface section 37 in the object server 31 and the communication section 14 in the agent section 13-1. After that, the agent section 13-1 transmits the inquiry information to the database operating section 35 in the object server 31. The database operating section 35 performs an inquiry process between the database unit 36 and itself, based on the received inquiry information. With this inquiry process, a search is made under a specified condition.

The agent section 13-1 transmits the path information to the path information operating section 34 via the interface section 37. Then, the path information operating section 34 stores that information in the path information table 33.

The result of the above described inquiry process is provided to the agent section 13-1 via the database operating section 35 and the interface section 37. The agent section 13-1 keeps that result as answer information.

The agent section 13-1 which stored the answer information returns to the network service space 11-1 of the user being the generation source via the wide area network 12 on the condition that it satisfies the request made by the user, and provides the result to the application program section 23 via the interface section 24. The application program section 23 makes a required modification to the obtained result, and outputs it to the terminal equipment 21.

If the user request is not satisfied, the agent section 13-1 moves to another network service space 11-3 via the wide area network 12 to repeat the same process. To determine a network service space 11-3 as a moving destination, the agent section 13-1 references the path information that another agent section 13-2 stores in the path information table 33, and selects an appropriate one from the information sources included in the path information. Then, the network service space 11-3 including the appropriate information source is determined as the next destination.

The agent section 13-1 repeats such a move and an inquiry until a predetermined parameter exceeds a threshold value. Elapsed time, cost, etc. are used as the parameter.

The agent section 13-1 which cannot satisfy the request although the parameter exceeds the threshold value, returns to the user network service space 11-1 via the wide area network 12, and answers that the request was not satisfied.

Figure 3:
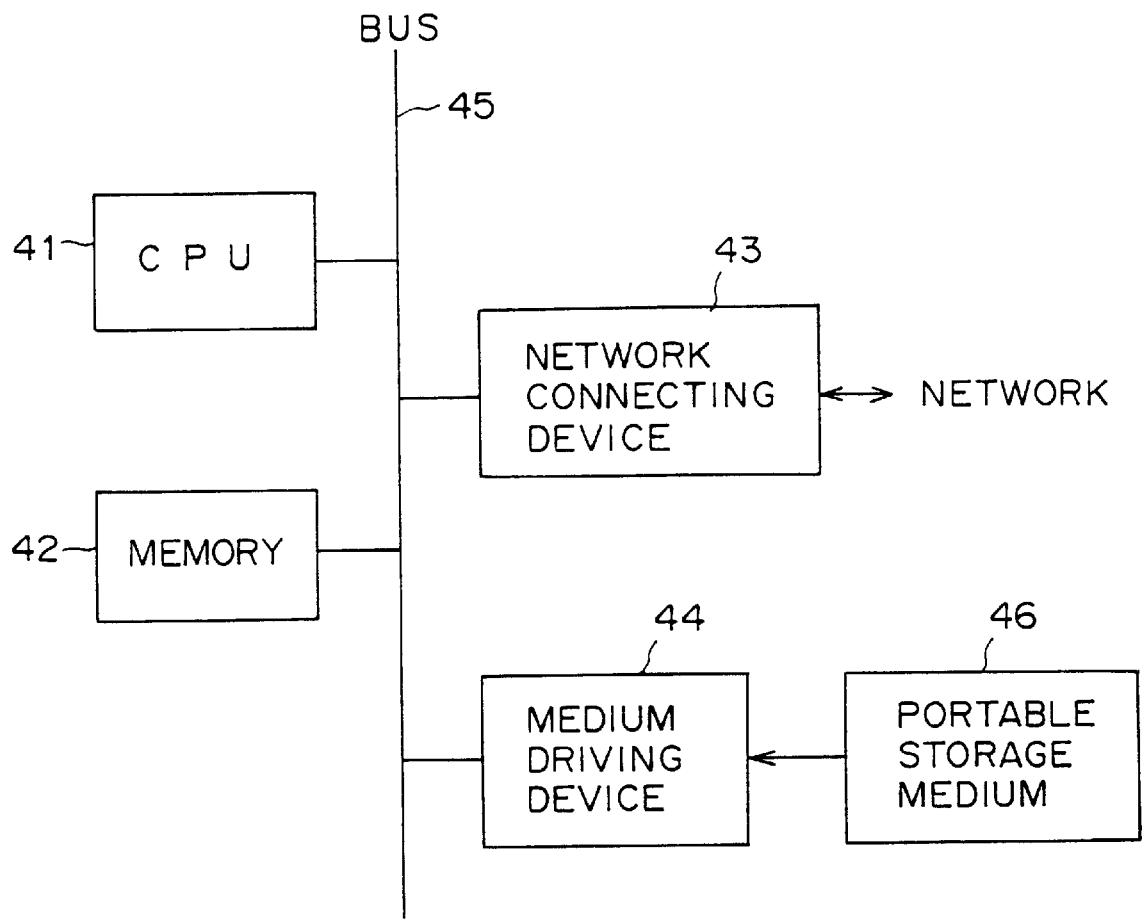
FIG. 3 is a block diagram showing the configuration of the information processing apparatus.

FIG. 3 is a block diagram showing an information processing device corresponding to the client 22, or the object servers 31 and 38 in FIG. 2. This device comprises a CPU (Central Processing:Unit) 41, memory 42, network connecting device 43, and medium driving device 44. A bus 45 links these components.

Programs, which correspond to the application program section 23, interface section 24, path information operating section 34, database operating section 35, and interface section 37 in FIG. 2, are stored, for example, in a memory 42, and executed by the CPU 41.

The interface sections 24 and 37 access a network such as a LAN connected to the wide area network 12 via the network connecting device 43. The terminal equipment 21 shown in FIG. 2 connected to that network, inputs an inquiry via the network connecting device 43, and receives the result of the inquiry.

The medium driving device 44 drives a portable storage medium 46, and can access its stored contents. An arbitrary computer-readable storage medium such as a memory card, floppy disk, CD-ROM (Compact Disk-Read Only Memory), optical disc, magneto-optical disc, etc. can be used as the portable storage medium 46. The portable storage medium 46 stores a program of each of processes performed by the above described client 22 and the object servers 31 and 38, in addition to data.

Figure 4:
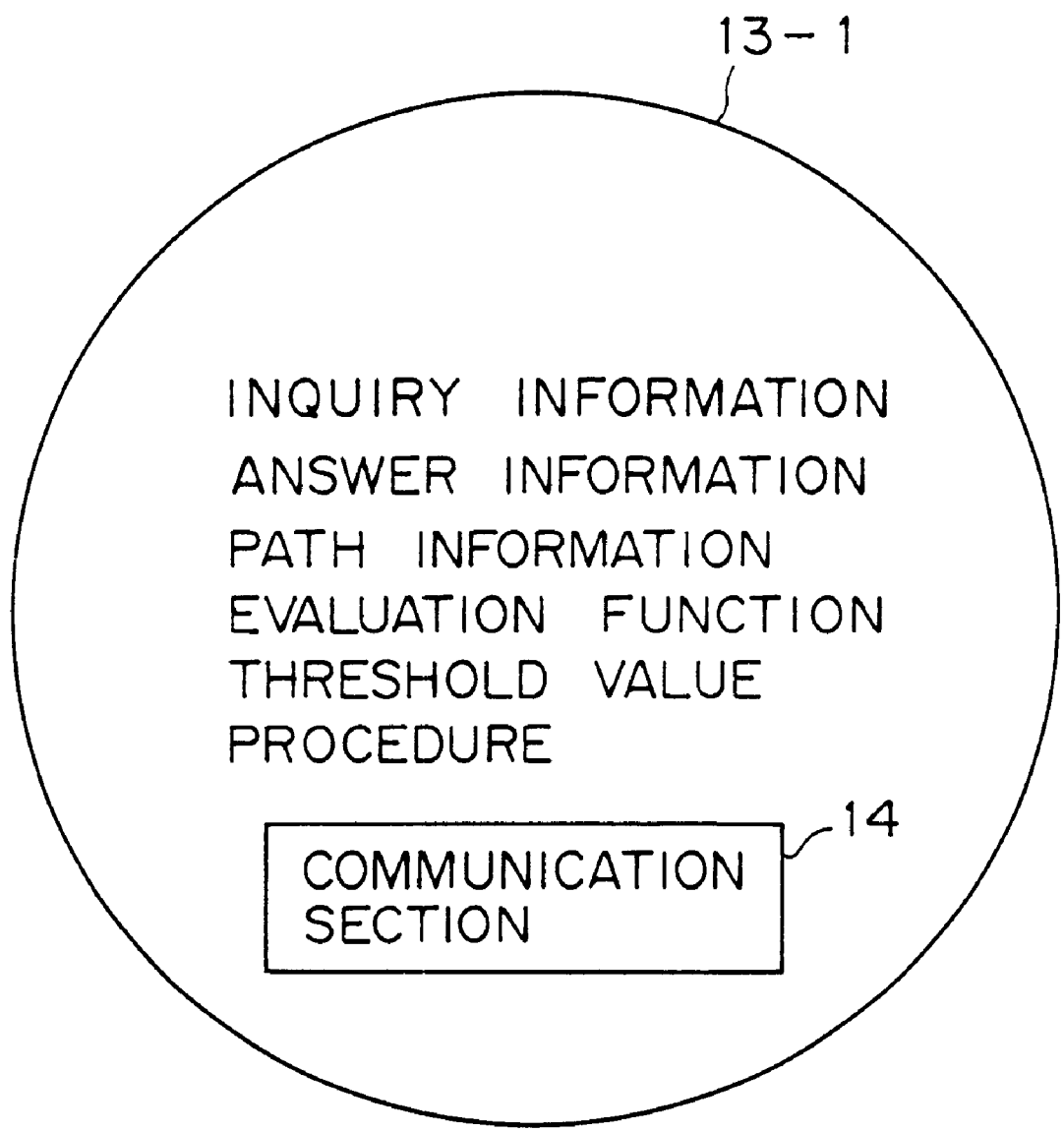
FIG. 4 is a schematic diagram showing the information stored in an agent section.

Provided next is the detailed explanation about the information that the agent section 13-1 holds, with reference to FIG. 4. The agent section 13-1 can hold various pieces of information such as inquiry information, answer information, path information, evaluation function, threshold value, and procedure. The contents of these pieces of information are listed below.

(1) Inquiry Information

Information about an inquiry when a user requests the agent section 13-1 to collect information. Specifically, a set of keywords vindicating the required information and a search condition composed of an operation expression among the keywords, correspond to this information. For example, the operation expression "(AAA Co. or BBB Co.) and new product" includes the keyword "AAA Co." or "BBB Co.", and at the same time, represents the information including the keyword "new product".

(2) Answer Information

Information obtained from an information source based on an inquiry made by the agent section 13-1.

(3) Path Information

Information about each of information sources when one or more information sources are searched based on an inquiry. This information is structured, for example, by arranging names and scores of the information sources accessed by the agent section 13-1 in access order. With a path information process to be described later, the path information of the agent section 13-1 is written to the path information table 33 arranged in each of the information sources, and new path information is read into the agent section 13-1 from the path information table 33.

(4) Evaluation Function

An algorithm for evaluating the degree of utilization of each information source based on the score of an information source included in obtained path information, and determining an information source to be visited next. Each of the agent sections 13-1 and 13-2 may have a different evaluation function.

(5) Threshold Value

A threshold value for setting a search termination condition in order to prevent a search from being continued infinitely due to an unsuccessful search for requested information during an information source search. The agent section 13-1 which searches for an information source aborts the information source search, and returns to the network service space 11-1 where the agent section 13-1 is generated, on the condition that a parameter representing an amount of resource used during the search exceeds the threshold value.

Elapsed time, search cost, etc. are used as the parameter. The search cost is, for example, the number of accessed object servers. Respective threshold values for the case where at least one piece of information can be obtained, and for the case where no piece of information can be obtained, may be used.

(6) Procedure

A procedure program describing a sequence of operations that the agent section 13-1 performs based on an inquiry request. According to this procedure program, the agent section 13-1 moves around the network service spaces 11-2 and 11-3 to search for an information source while determining an information source to visit next based on an evaluation function, and performs the inquiry operations for an information source. Then, it returns to the original network service space 11-1, and provides the result of the inquiry to the user.

Provided next is the explanation about the contents of path information stored in the path information table 33. FIG. 5 exemplifies the path information table 33 in an information source Z.

In the path information table 33 shown in FIG. 5, a "keyword" means a word or a phrase for determining the required information based on an inquiry request. A "path" indicates information sources visited by an agent section which registered the path information in a corresponding row. If "A(15)-> B (40)-> H (30)-> Z (80)", it indicates that the agent section visited the other information sources A, B, and H in this order until it reached the current information source Z.

In this column of "path", a numeral enclosed in parentheses succeeding each of the information source names indicates a score that the agent section gives to each of the information sources. The score is given to the result obtained from each of the information sources using a keyword in a corresponding row included in an inquiry. In general, two agent sections that have exactly the same inquiry information and evaluation function give the same score to an information source.

It is seen from FIG. 5 that agent sections a563 and a058 that have the same keyword "part PPP", reached the information source Z on Dec. 11, 1995, and that different scores are given to the information source Z. This is because the inquiry requests from the agent sections a563 and a058 are different. For example, the agent section a563 requests the "part PPP provided by AAA Co.", while the agent section a058 requests the "part PPP provided by BBB Co.".

An "agent" indicates an identifier appended to an agent section that registered the path information on a corresponding row. A "date" indicates a date on which the agent visits the current information source Z. Whenever each of the agent sections performs an inquiry process, the data in each of the rows in the path information table 33 is added in the course of the path information process following the inquiry process.

Here, it is assumed that the agent section 13-1 requiring the information about a keyword "pay" references the path information table 33 when the path information table 33 in the agent management unit 32 includes the contents shown in FIG. 5. At this time, the agent section 13-1 determines the information source N that the other agent section a015 visited prior to the current information source Z, as a destination to visit next.

This is because the agent section a015 requiring the information about the same keyword "pay" is proved to have given the highest score "95" to the information source N that the agent section a015 itself visited immediately before the information source Z, according to the information that the agent section a015 registered to the path information table 33 on Dec. 5, 1995, that is, "J(2)-> B(23)-> N(95)-> Z(25)".

As described above, it is possible to set an evaluation function for determining the information source with the highest score as the information source to be visited next when there are unidentified information sources among information sources with a considerably high score that an agent section requiring the information about the same keyword previously visited. The determination of the information source to be visited next is not limited to this evaluation function. It is also possible to determine an information source to be visited next according to the path information in the path information table 33, by using another evaluation function.

It is assumed that the agent section 13-1 learns from the registered information about the "AAA Co." dated Dec. 5, 1995 and Dec. 13, 1995, included in the path information table 33 shown in FIG. 5, that the agent section a752 visited an information source P twice.

At this time, the agent section 13-1 makes a comparison between the paths including the same information source P registered on Dec. 5, 1995 and on Dec. 13, 1995, and learns that the score of the information source P increased from 50 to 89. According to this phenomenon, it is estimated that the information source P was updated on any of the days from December 5 through 13, and the obtained information has increased.

Accordingly, it is determined according to the path information that, even if the agent section a752 visited the information source P prior to Dec. 5, 1995, the new information updated thereafter can be obtained from the information source P. As a result, the information source P can be raised as a candidate for the information source to be visited next.

In this way, describing a date in path information makes the agent section 13-1 learn of any change that has occurred in information possessed by an information source, thereby performing a process depending on the change.

As described above, various evaluation functions for determining an information source to be visited next according to path information can be considered, and endowing the agent section 13-1 with a function satisfying a request allows an information source including required information to be selected efficiently.

Additionally, the following method may be considered as a method for determining the score for an information source. For example, if the information including a keyword "personnel" is searched, the score of the information source corresponding to that keyword is defined as 0 on the condition that no information satisfying the request is included in the information source.

If any information satisfying the request is found, the ratio of the total amount of information that can be obtained from the information source to the total amount of information required by the agent section 13-1 is obtained as a percentage, and defined as the score of the information source. Assuming that 100 pieces of information including the keyword "personnel" are requested, the score becomes 50 on the condition that 50 pieces of information can be obtained.

Other than this method, an arbitrary method for determining the score of an information source can be adopted. The selection of the method depends on the implementation of the information access apparatus. An example of the method for determining the score of an information source will be described in detail later.

Provided next is the explanation about the sequence of operations performed by the agent section 13-1, by referring to FIG. 6 through FIG. 11.

Figure 6:
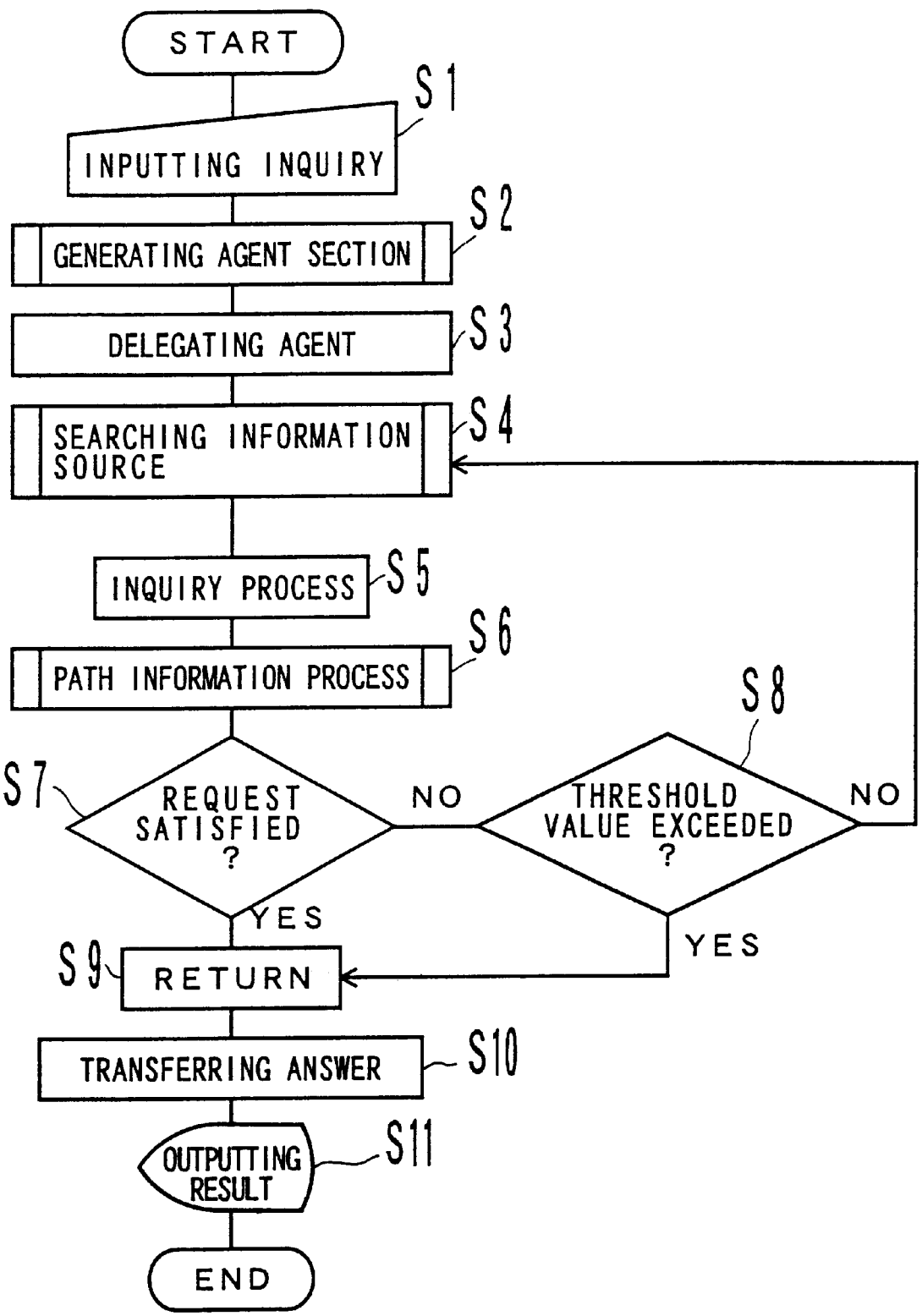
FIG. 6 is a flowchart showing the operations performed by the agent section.

FIG. 6 is a flowchart showing the operation performed by the agent section 13-1. When the process is started, a user inputs an inquiry request from terminal equipment 21 (step S1). Next, an application program section 23 in a client 22 generates the agent section 13-1 (step S2), and delegates it to an information source (step S3).

The agent section 13-1 sent out to the wide area network 12 searches for an information source based on the inquiry information (step S4), and performs an inquiry process for a database unit 36 at the information source that the agent section 13-1 has reached (step S4) to receive the result (step S5). Then, the agent section 13-1 performs a path information process (step S6), and determines whether or not the inquiry request is satisfied (step S7).

If the inquiry request is not satisfied, it is determined whether or not a parameter serving as an indicator of search termination exceeds a threshold value (step S8). If the parameter does not exceed the threshold value, the information search process is repeated (step S4).

If the inquiry request is satisfied in step S7, or if the parameter exceeds the threshold value in step S8, the agent section 13-1 returns to the client 22 (step S9) and transmits an answer to the application program section 23 (step S10). The application program section 23 outputs the received answer to the terminal equipment 21 as the result of the inquiry(step S11), and terminates the process.

In step S4 where an information source to be visited next is determined, an information source which appears to be most suitable is selected from information sources included in the path information that the other agent section 13-2, etc. left, according to the information in the path information table 33.

As described above, taking advantage of the path information among a plurality of agents allows a required information source to be efficiently and quickly searched among a number of object servers distributed in a wide area.

FIG. 7 is a flowchart showing the process for generating the agent section 13-1 performed in step S2 in FIG. 6. Once the process is started, the application program section 23 secures a storage area for the agent section 13-1 in a memory 42 (step S21). Then, the application program section 23 sequentially registers the procedure, inquiry information, evaluation function, and threshold value, which are shown in FIG. 4, to the storage area (steps S22, S23, S24, and S25), and terminates the process.

In this way, a new agent section 13-1 is generated in the operating environment of the client 22. If an equivalent agent section is re-generated due to the fact that the agent section 13-1 which returned to that environment does not satisfy the inquiry request, the path information kept at the time of the return is further registered to the storage area.

FIG. 8 is a flowchart showing the process for searching an information source performed in step S4 in FIG. 6. Since the agent section 13-1 normally holds either the path information registered at the time of the generation, or the path information obtained from the path information table 33 in the information source, it performs the search process according to either of the available information.

Once the process is started, the agent section 13-1 reads the held path information (step S31). Next, the agent section 13-1 applies an evaluation function to the obtained path information (step S32), and determines the information source having the highest score (step S33). Then, the agent section 13-1 determines whether or not the information source at the moving destination is decided (step S34), and moves to the information source if so determined (step S35). The agent section 13-1 then terminates the process.

If the information source is not determined in step S34, it is then determined whether or not the above described parameter exceeds the threshold value (step S36). If the parameter does not exceed the threshold value, the process in and after step S31 is repeated. If the parameter exceeds the threshold value in step S36, the agent section 13-1 returns to the client 22 (step S9 in FIG. 6). The threshold value used for the determination made in step S36 may be identical to, or different from, the threshold value used in step S8 in FIG. 6.

If the agent section 13-1 is a newly-created one and does not hold path information, a suitable information source is selected as the moving destination according to the designation information provided by the user or the application program section 23.

Here, an example of the algorithm of an evaluation function used in step S32 in FIG. 8 will be described. The path information possessed by the agent section 13-1 includes a keyword indicating the information that the agent section 13-1 currently requires, and the score of the information source providing that information.

If the agent section 13-1 keeps, for example, the operation expression "AAA Co. and part PPP" as the inquiry information, the path information read in step S31 from the path information table 33 in FIG. 5 is the one shown in FIG. 9. It is seen from FIG. 9 that rows including the keyword "AAA Co." and the rows including the keyword "part PPP" are extracted from the path information table 33 in FIG. 5.

In steps S32 and S33 in FIG. 8, an information source satisfying each of the conditions is obtained according to this path information in the order of processes as follows.

[1] Removes an identified information source which was previously visited from information sources included in the path information.
[2] Selects an information source which includes both the keywords "AAA Co. " and "part PPP", and whose score is the highest.
[3] Selects an information source which includes either of the keywords "AAA Co." and "part PPP", and has the highest score.
[4] Selects an information source whose date is the most recent among information sources satisfying the above described conditions [2] and [3].
[5] Obtains an information source satisfying each of the above described conditions [2], [3], and [4] in this order, covering the information source removed in the above described [1], if the path information does not include the information about the information source satisfying the inquiry request.
[6] If the information source to be visited cannot be determined according to the path information, the agent section 13-1 returns to the client 22 (steps S34, S36, and S9).

If the information sources other than the information source Z are assumed to be unidentified in FIG. 9, an information source T (80) is selected as the information source including both of the keywords "AAA Co." and "part PPP", according to the above described process [2]. Next, an information source P (89) having the highest score 89 is selected from the information sources F, P, S, and V which include either of the keywords "AAA Co." and "part PPP", according to the process [3].

If a comparison is made between the dates of the two records T(80) and P(89), the date of the record P (89) is more recent than that of the record T(80). As a result, the information source P is finally selected as the moving destination according to the process [4].

Figure 10:
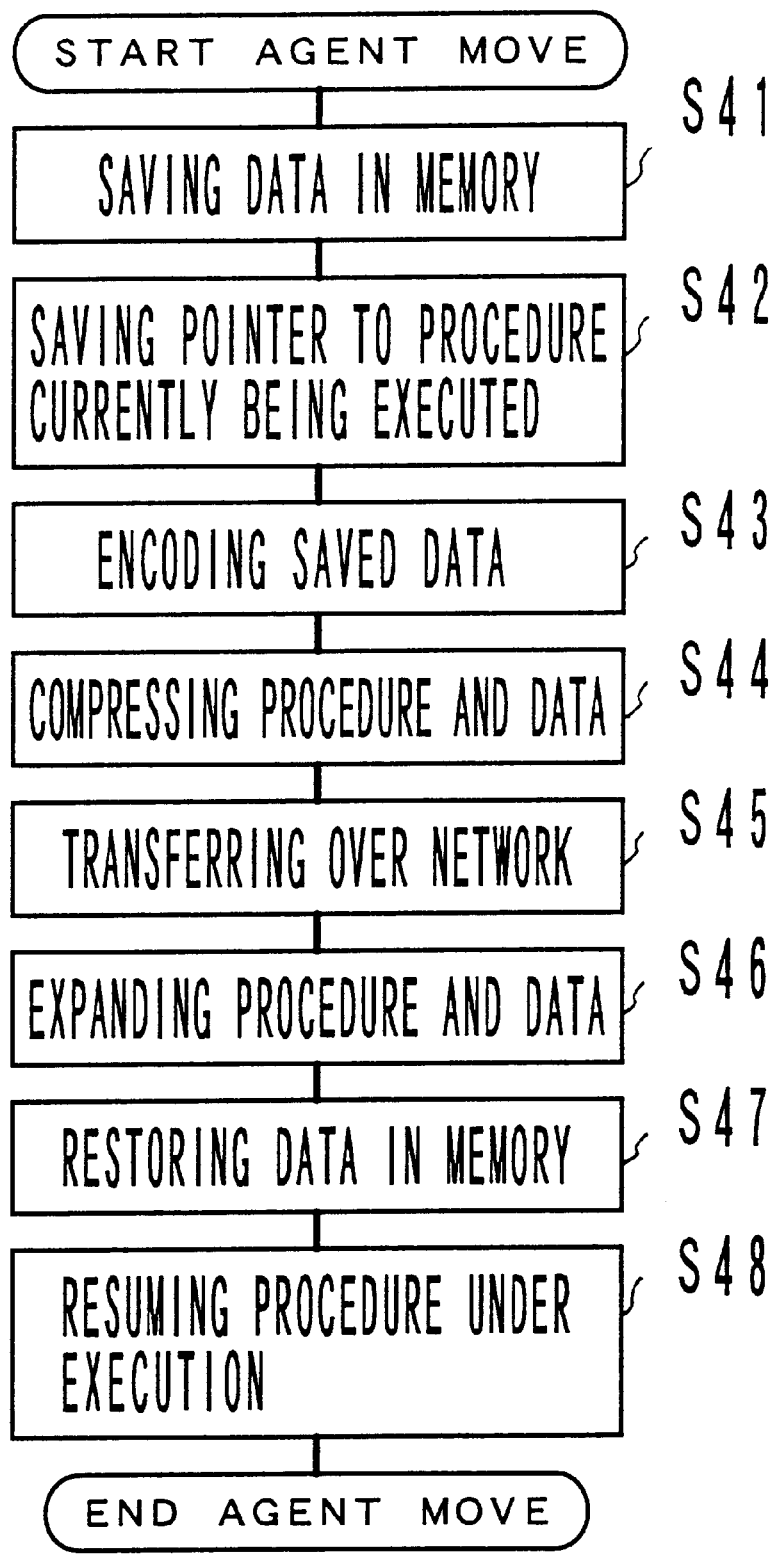
FIG. 10 is a flowchart showing a moving process performed by the agent section.

FIG. 10 is a flowchart showing the moving process performed by the agent section 13-1 in step S35 in FIG. 8.

The agent section 13-1 is a program executed while moving around a network, and an artificial agent of a user collecting required information from an information source. The agent section 13-1 internally possesses procedure and data, and moves around the network service spaces 11-1, 11-2, and 11-3 over the wide area network 12, according to the described procedure.

The agent section 13-1 temporarily aborts the procedure being executed when moving, and is frozen (compressing process). The agent section 13-1 that reaches the network service space being the moving destination is defrosted after it moves (decompressing process). The defrosted agent section 13-1 then resumes the process that was being executed prior to freezing.

Here, the freezing process means that temporary variables which are the operating environment of the procedure performed by the agent section 13-1, the information in the memory 42 required for executing the procedure, the information about the procedure being executed, etc. are compressed into a data sequence, to be transmitted over a network. The frozen agent section 13-1 is transmitted over the network in a similar manner as in a normal data transmission.

On the other hand, the defrosting process means that the compressed data sequence is decompressed and restored to the original procedure and information in the memory 42, in order to restore the operating environment of the procedure executed by the agent section 13-1 prior to freezing.

The freezing/defrosting processes can be embedded as a portion of the capabilities of the application program section 23 and the agent management unit 32 in FIG. 2. Here, the program performing these processes are simply called a software engine.

Once the process is started as shown in FIG. 10, the software engine embedded in the information processing device where the agent section 13-1 exists, saves the data in the memory 42 (step S41), and saves the pointer to the procedure currently being executed (step S42). Then, the software engine encodes the saved data (step S43), and compresses the procedure and data (step S44) to transmit them to the network (step S45).

A software engine in an information processing device being the moving destination to which the agent section 13-1 moves, decompresses the received procedure and data (step S46), and restores the data in the memory 42 (step S47). Then, the software engine makes the agent section 13-1 resume the procedure which was being executed prior to the move (step S48), and terminates the process.

Figure 11:
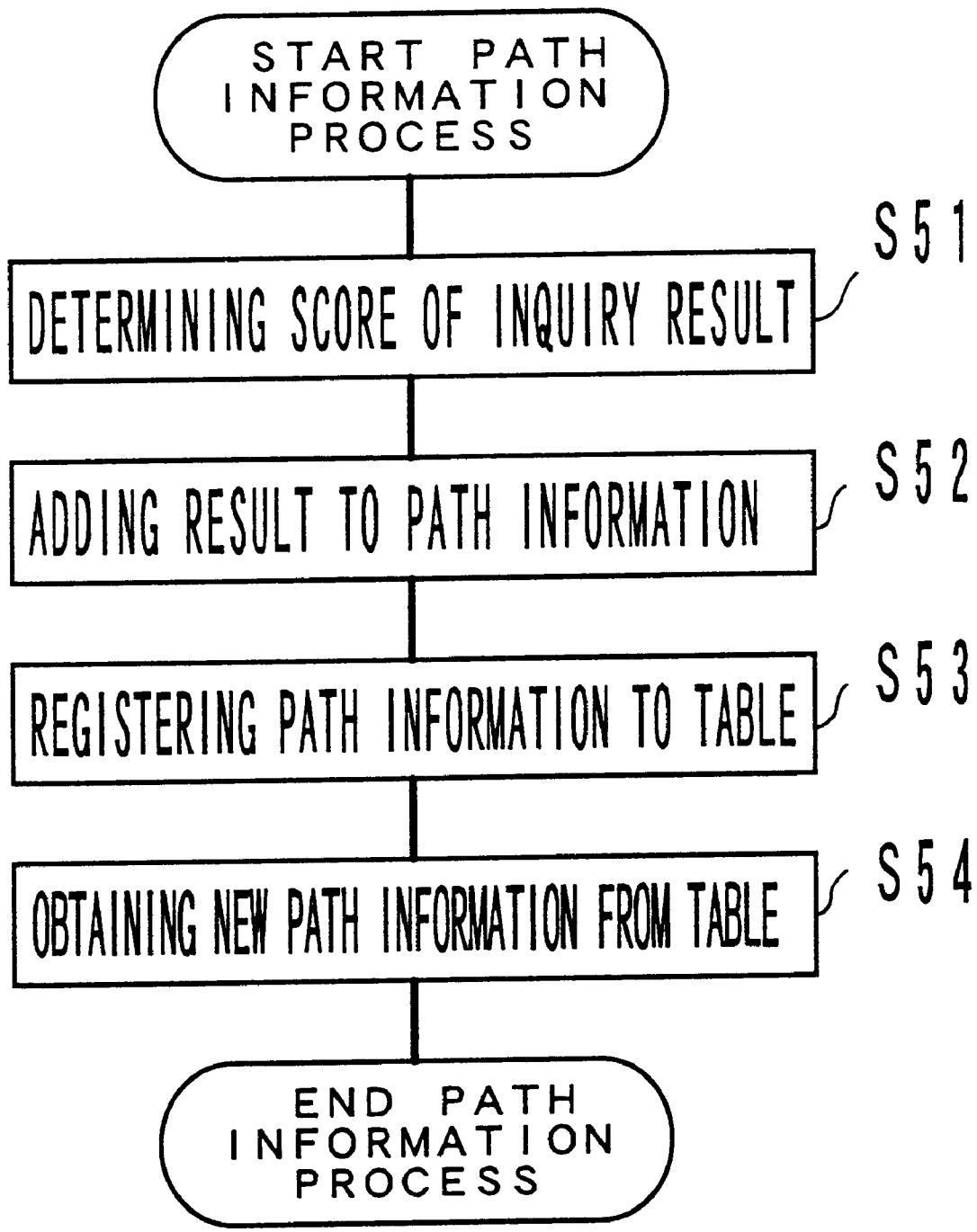
FIG. 11 is a flowchart showing a path information process.

FIG. 11 is a flowchart showing the path information process performed in step S6 in FIG. 6. In step S5 receding the path information process, the agent section 13-1 which reached the information source performs an inquiry process, and obtains the required information from the information source.

Once the process is started, the agent section 13-1 first determines the score of the result of the inquiry obtained from the information source (step S51), appends that result to the path information possessed by the agent section 13-1, and passes the path information with the result appended to the path information operating section 34 through the interface section 37 in the information source (step S52). The path information operating section 34 registers the received path information to the path information table 33 (step S53).

Then, the agent section 13-1 obtains new path information as the information for determining the information source to visit next, from the path information table 33 according to a reverse procedure (step S54), and terminates the process. In step S54, the agent section 13-1 obtains only the path information including the keyword corresponding to the inquiry information made by the agent section 13-1 itself.

The following case will be described as an example of the method for determining the score of an information source in step S51.

(a) It is assumed that the information required by the agent section 13-1 is represented by the keyword K, and an amount of information corresponding to the keyword K among the total amount "M" of information in an information source R is defined as "m". In this case, the score of the information source R is represented by m/M, or by (m/M)×100 as a percentage.

For example, if the total number of pieces of information stored in the information source R is 1,000, and 100 pieces among them are suitable for the keyword, the score that the agent section 13-1 requiring the information represented by the keyword "AAA Co.", determines for the information source R becomes that obtained by representing its ratio as a percentage (100/1000)×100=10.

(b) If the ratio of the amount of information corresponding to the keyword K existing in other information source is relatively small, the above described score "m/M" of the information source R may be multiplied by a weighting factor W1.

Assume that the score determined for the information source R is 10, and the non-existence of the same information in the other information sources can be verified by some means or another. In this case, the score may be doubled to 20.

(c) If all of the pieces of information that the agent section 13-1 requires cannot be obtained from one information source, the pieces of information have to be obtained from a plurality of information sources. In this case, a weighting factor W2 may be added to the score of the information source R depending on the degree of satisfying the request made by the agent section 13-1 in each information source on the path where the agent section 13-1 searches for the information.

Assume that the request for the pieces of information corresponding to the keyword K, made by the agent section 13-1, is satisfied by obtaining them from two information sources R1 and R2. If the scores of R1 and R2 are 10 and 30 respectively in this case, the number of pieces of information corresponding to the keyword K existing in the information source R2 is expected to be larger than in R1 relatively. Accordingly, the weighting factor 10 can be added to the score 30 of R2 alone, which results in a score of 40.

(d) If all of the pieces of information that the agent section 13-1 requests can be obtained from one information source R, the score P of that information source may be multiplied by a weighting factor W3 to increase the score of the information source.

Assuming that the score of the information source R is 5, the value 10 obtained by doubling the score 5 of the information source R may be defined as the result of determining the score, on the condition that the request made by the agent section 13-1 is completely satisfied with the information source R.

(e) If a huge number of pieces of information exist in the information source R, or if the ratio of the pieces of information corresponding the keyword K is relatively small, the score of the information source R becomes lower according to the scoring method (a). To prevent this, the score must be normalized.

Accordingly, an average value "v" of a total number of pieces of information in another identified information source is obtained beforehand, based on the assumption that the total number of pieces of information pieces stored in that information source can be determined by some means or another. In this case, the score of the information source R can be normalized by multiplied that score by a weighting factor M/v.

Assuming that the total number of pieces of information existing in the information source R is 100,000, the number of pieces of information corresponding to the keyword K is 100, and the average value of pieces of information existing in another identified information source is 1,000, the score of the information source R is determined as follows:

(100/100,000)×(100,000/1,000)×100=10.

(f) In addition to the methods (a)~(e) in which a score is determined based on the ratio of the number of pieces of information corresponding to a keyword to the number of pieces of information stored in each information source, the total number "M" of pieces of information stored in the information source R may be defined as its score.

If this method is used, it becomes possible to give a higher score to an information source including the larger number of stored pieces of information, without using any keyword knowledge about in which information source the required information exists. This scoring method is based on the judgment that the greater the number of pieces of information stored in an information source, the greater the possibility of the existence of the required information.

As a method for determining the score of an information source as described above, there is the method for defining the ratio of the number of pieces of information corresponding to a request to the total number of pieces of information in each information source, as a score by regarding each information source as being independent. Additionally, there is another method for adopting a weighting factor to give a more effective score, considering how high the degree of relatively satisfying a request by one of a plurality of information sources is.

In addition, normalizing a score is effective for multiplication and addition using a weighting factor so that all information sources can be scored based on the same scale.

Figure 12:
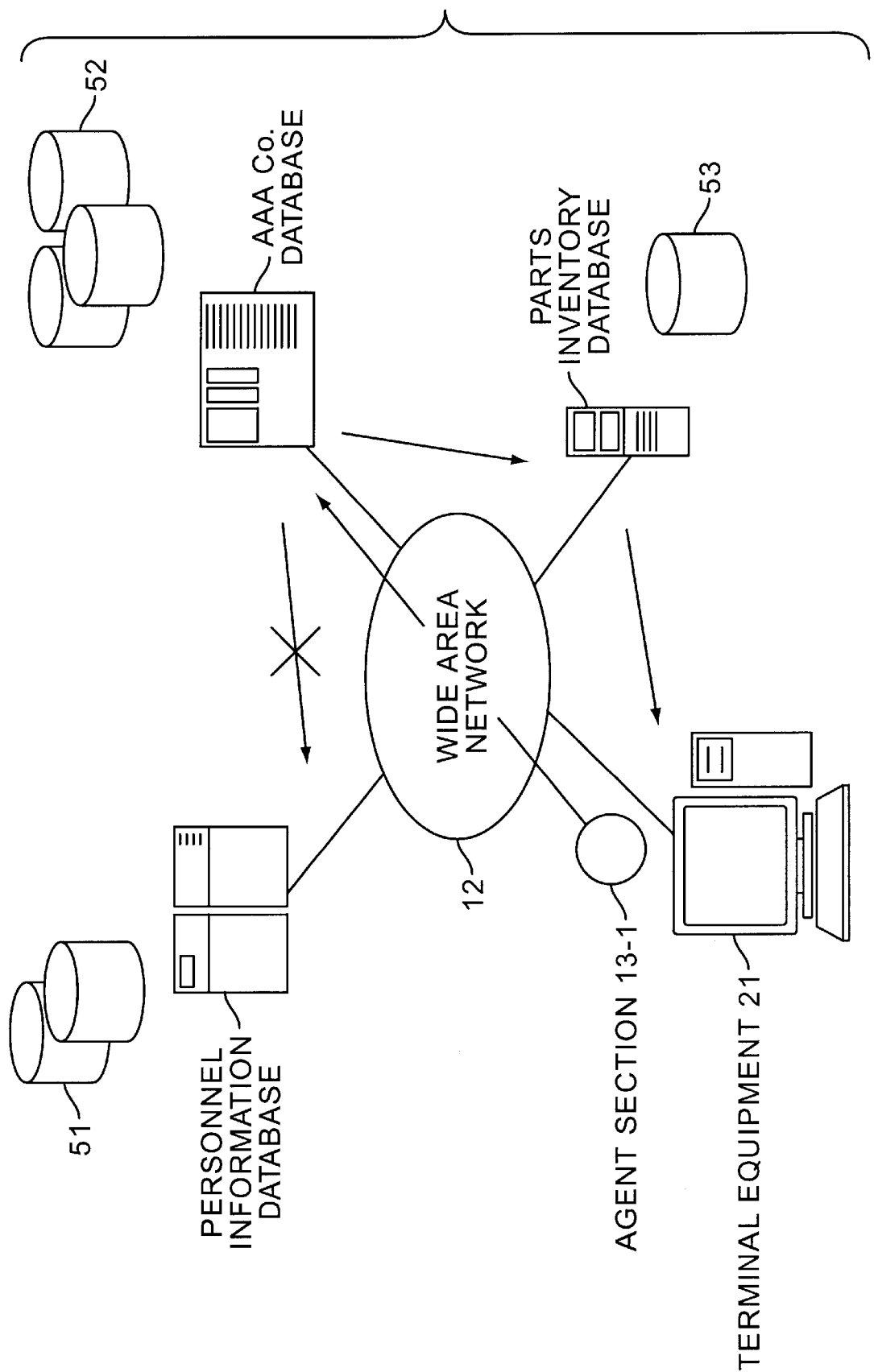
FIG. 12 is a schematic diagram showing a search made over a wide area distributed information system.

Provided next is the explanation about the example of the information source search performed in the wide area distributed information system in FIG. 2, by referring to FIG. 12. In FIG. 12, a personnel information database 51, AAA Co. database 52, parts inventory database 53, and terminal equipment 21 are linked by a wide area network 12.

The case where a user requests information about a new product released by the AAA Co. from the terminal equipment 21 will now be considered. The agent section 13-1 sent to the AAA Co. database 52 makes an inquiry to the AAA Co. database 52. As a result, the agent section 13-1 obtains the information about the specification of the new product.

Since the details of the inventory are unclear in the AAA Co. database 52, however, the agent section 13-1 references the path information 33 in the agent management unit 32 in the network service space 11-2 to which the AAA Co. database 52 belongs. As a result, the agent section 13-1 determines that it is better to search the parts inventory database 53 of a distributor rather than the personnel information database 51.

In this way, the agent section 13-1 learns of the existence of the parts inventory database 53 that the agent section 13-1 itself did not identify, and moves to that database 53 to obtain the necessary information.

In the above described embodiment, even if a fault, etc. occurs in any of the information sources, which leads to being unable to access that information source, it can be detected beforehand by only partially adding the registered information to the path information table 33.

FIG. 13 exemplifies the case where such an expansion is made to the path information table 33 in FIG. 5. In this figure, a column "information source where a fault occurs" is added to the path information table 33 as a column of fault information. This column includes the information about the information sources that each agent section cannot reach on the path leading to the current information source Z.

For example, "A->L" indicates that the agent section a015 could not reach the information source L due to the occurrence of a fault on the path, etc. from the information source A to the information source L. Additionally, "Q" indicates that a fault occurred in the information source Q itself, to which no access could be made. Here, the hyphen "-" in this column indicates that there was no information source on the path, which the agent section could not reach.

It is seen from FIG. 13 that the agent section a752 could not reach the information source Q on Dec. 5, 1995. In the meantime, the agent section a569 included the information source Q in its path on Dec. 10, 1995. Judging from these data, it seems that the information source Q was in a fault state on December 5, was restored thereafter, and access became possible on December 10.

Accordingly, an agent section which referenced the path information table 33 in the period from December 5 through 10 can remove the information source Q from search targets, since it was in a fault state in this period. Furthermore, an agent section that referenced the path information table 33 after December 10 can include it as a search target, since the fault of the information source Q had been restored.

As described above, adding the fault information to the path information allows an information source which the agent section 13-1 cannot reach to be detected beforehand, when the agent section 13-1 determines an information source to visit next. As a result, the information can be collected more efficiently.

Although the above described embodiment adopts an agent which can freely move around a network, the present invention is not limited to this type of agent. The present invention can be applied to all types of agent capabilities which perform intelligent operations instead of users, including a process fixed in a computer.

Such an immovable agent communicates with another agent on another computer to exchange information about information sources that they have accessed, and can determine an information source to access next based on the obtained information.

According to the present invention, access information about previously-accessed information sources can be cooperatively shared among a plurality of agents when a number of information sources distributed on a communications network are searched using an agent.

Each of the agents can select an information source to search for next among the information sources which were previously accessed by another agent, by referencing the access information. Therefore, information sources; to be accessed are screened, thereby obtaining the required information efficiently and quickly from various types of information sources put into an electronic form and distributed over an extensive range.

What is claimed is:

1. An information access apparatus for use in a distributed information system having a plurality of information sources updated autonomically and linked by a communications network, comprising:

an agent generator generating a first agent section that moves around the communications network and obtains at a destination knowledge about a path including at least one information source accessed by a second agent section moving around the communications network and autonomically collecting information on the communications network, among the plurality of information sources, each one of the plurality of information sources storing information independently and updated autonomically, the knowledge including keyword information which indicates a search condition about information searched for by the second agent section, determines an information source to be accessed using the knowledge as path information to the information source to be accessed if the keyword information of the second agent section partially matches keyword information which indicates a search condition about information searched for by the first agent section, moves to a determined information source and obtains information from the determined information source, the agent generator delegating the first agent section to the destination through the communications network; and an output device outputting the information that the first agent section collects when the first agent section returns to the information access apparatus.

2. The information access apparatus according to claim 1, further comprising:

an input device inputting a request from a user to said agent generator, wherein said agent generator generates the first agent section based on the request.

3. An information access apparatus for use in a distributed information system which possesses a plurality of information sources updated autonomically managing arbitrary objects and autonomically operated on a communications network, and collects information by delegating an artificial agent section to an arbitrary information source, comprising:

a connecting device connecting to the communications network; and a sharing device making a plurality of agent section, that move around the communications network, cooperatively share knowledge about a path including at least one information source among the plurality of information sources, each one of the plurality of information sources storing information independently and updated autonomically, the knowledge including keyword information which indicates a search condition about information searched for by each of the plurality of agent sections and each agent section determining and moving to an information source to be accessed using the knowledge as path information to the information source to be accessed if the keyword information of each agent section partially matches keyword information which indicates a search condition about information searched for by another agent section, to facilitate a search for and an access to any of the plurality of information sources made by each of the plurality of agent sections.

4. A computer-readable storage medium, when used by a computer in a distributed information system having a plurality of information sources updated autonomically linked by a communications network, used to direct the computer to perform:

generating a first agent section that moves around the communications network and obtains at a destination knowledge about a path including at least one information source accessed by a second agent section moving around the communications network and autonomically collecting information on the communications network, among the plurality of information sources, each one of the plurality of information sources storing information independently and updated autonomically, the knowledge including keyword information which indicates a search condition about information searched for by the second agent section, determines an information source to be accessed using the knowledge as path information to the information source to be accessed if the keyword information of the second agent section partially matches keyword information which indicates a search condition about information searched for by the first agent section, moves to a determined information source and obtains information from the determined information source based on the knowledge;

delegating the first agent section to the destination through the communications network; and outputting information that the first agent section collects when the first agent section returns to the computer.

5. A computer-readable storage medium, when used by a computer in a distributed information system which possesses a plurality of information sources updated autonomically managing arbitrary objects and autonomically operated on a communications network, and collects information by delegating an artificial agent section to an arbitrary information source, used to direct the computer to perform:

making a plurality of agent sections, that move around the communications network, cooperatively share knowledge about a path including at least one information source among the plurality of information sources, each one of the plurality of information,sources storing information independently and updated autonomically, the knowledge including keyword information which indicates a search condition about information searched for by each of the plurality of agent sections and each agent section determining and moving to an information source to be accessed using the knowledge as path information to the information source to be accessed if the keyword information of each agent section partially matches keyword information which indicates a search condition about information searched for by another agent section, to facilitate a search for and an access to any of the plurality of information sources made by each of the plurality of agent sections.

6. An information access method for collecting information from a plurality of information sources updated autonomically linked by a communications network, comprising:

generating a first agent section that moves around the communications network and obtains at a destination knowledge about a path including at least one information source accessed by a second agent section moving around the communications network and autonomically collecting information on the communications network, among the plurality of information sources, each one of the plurality of information sources storing information independently and updated autonomically the knowledge including keyword information which indicates a search condition about information searched for by the second agent section, determines an information source to be accessed using the knowledge as path information to the information source to be accessed if the keyword information of the second agent section partially matches keyword information which indicates a search condition about information searched for by the first agent section, moves to a determined information source and obtains information from the determined information source based no the knowledge;

delegating the first agent section to the destination through the communications network; and outputting information that the first agent section collects when the first agent section returns.

7. An information access method for collecting information from an arbitrary information source updated autonomically by delegating an artificial agent section to a plurality of information sources managing arbitrary objects and autonomically operated on a communications network, comprising:

making a plurality of agent sections, that move around the communications network, cooperatively share knowledge about a path including at least one information source among the plurality of information sources, each one of the plurality of information sources storing information independently and updated autonomically, the knowledge including keyword information which indicates a search condition about information searched for by each of the plurality of agent sections and each agent section determining and moving to an information source to be accessed using the knowledge as path information to an information source to be accessed if the keyword information of each agent section partially matches keyword information which indicates a search condition about information searched for by another agent section, to facilitate a search for and an access to any of the plurality of information sources made by each of the plurality of agent sections.

8. An apparatus comprising:

a plurality of agents that move around an autonomic distributed information system, the agents collecting information from a plurality of information sources on the autonomic distributed information system, each one of the plurality of information sources storing information separately and updated autonomically, the plurality of agents responsive to an independent search request, and store corresponding path information relating to a location of the collected information from one of the plurality of information sources along with the search request; and a sharing device, if keywords in the search request partially match, sharing the search request, collected information and corresponding path information between the plurality of agents.

9. An information access method for sharing path information comprising:

generating agents that move around on an autonomic communications network, the autonomic communications network containing a plurality of information sources storing information separately and updated autonomically;

collecting information from one of the plurality of information sources and a corresponding path to the information by the agents responsive to an independent search request; and sharing, if keywords in the search request partially match, the search request, the information and the corresponding path with other agents.

10. An apparatus comprising:

a means for generating agents that move around on an autonomic communications network, the autonomic communications network containing a plurality of information sources storing information separately and updated autonomically;

a means for collecting information from one of the plurality of information sources and a corresponding path to the information by the agents responsive to an independent search request; and a means for sharing, if keywords in the search request partially match, the search request, the information and the corresponding path with other agents.

11. An information access method carried out by a plurality of agents linked by an autonomic communications network comprising:

collecting information and corresponding path information, responsive to an independent search request, from the communications network, the communications network containing a plurality of information sources storing information separately and updated autonomically; and sharing, if keywords in the search request partially match, the search request, the information from one of the plurality of information sources and the path information to the one of the plurality of information sources with other agents, wherein the plurality of agents move around the communications network.

* * * * *